United States Patent
Liu

(10) Patent No.: US 9,215,751 B2
(45) Date of Patent: Dec. 15, 2015

(54) MOBILE TERMINAL WITH ROUTING FUNCTION FOR SUPPORTING MULTIPLE-MODE ACCESS AND IMPLEMENTATION METHOD THEREOF

(75) Inventor: Jiajun Liu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 245 days.

(21) Appl. No.: 13/878,344

(22) PCT Filed: Mar. 4, 2011

(86) PCT No.: PCT/CN2011/071532
§ 371 (c)(1),
(2), (4) Date: Apr. 8, 2013

(87) PCT Pub. No.: WO2012/048549
PCT Pub. Date: Apr. 19, 2012

(65) Prior Publication Data
US 2013/0217437 A1    Aug. 22, 2013

(30) Foreign Application Priority Data
Oct. 12, 2010    (CN) .......................... 2010 1 0504028

(51) Int. Cl.
*H04W 88/06* (2009.01)
*H04W 48/18* (2009.01)
*H04W 88/10* (2009.01)

(52) U.S. Cl.
CPC .............. *H04W 88/06* (2013.01); *H04W 48/18* (2013.01); *H04W 88/10* (2013.01)

(58) Field of Classification Search
None
See application file for complete search history.

(56) References Cited

U.S. PATENT DOCUMENTS

2005/0271020 A1* 12/2005 Thermond ..................... 370/338
2006/0039338 A1*  2/2006 Kwon et al. ................... 370/338
(Continued)

FOREIGN PATENT DOCUMENTS

CN    201029235 Y    2/2008
CN    201355871 Y    1/2009
(Continued)

OTHER PUBLICATIONS

English Translation of the International Search Report and Written Opinion of the International Searching Authority of corresponding International Application No. PCT/CN2011/071532; mail date Jul. 11, 2011; 7 pages.
(Continued)

*Primary Examiner* — Alejandro Rivero
(74) *Attorney, Agent, or Firm* — Moore & Van Allen PLLC

(57) ABSTRACT

The present disclosure discloses a mobile terminal with routing function for supporting multiple-mode access and implementation method thereof, which includes: an Asymmetrical Digital Subscriber Line (ADSL) interface module is utilized for accessing ADSL wired broadband signals, a Third Generation (3G) interface module is utilized for accessing wireless broadband signals, a Wireless Fidelity (WIFI) module is utilized for establishing wireless local area network, a main control module establishes a first data transmission channel for connecting with the ADSL interface module, establishes a second data transmission channel for connecting with the 3G interface module, and controls the WIFI module to access the first data transmission channel or the second data transmission channel. According to the technical solutions of the present disclosure, realize the conversion from the wireless broadband signals or the wired ADSL signals to the WIFI signals, and therefore support multiple external terminals to access the network.

5 Claims, 3 Drawing Sheets

(56) References Cited

U.S. PATENT DOCUMENTS

| | | | |
|---|---|---|---|
| 2008/0101266 A1* | 5/2008 | Dahlstedt et al. | 370/310 |
| 2008/0117860 A1 | 5/2008 | Rodriguez | |
| 2008/0310366 A1* | 12/2008 | Oba et al. | 370/331 |
| 2009/0180449 A1 | 7/2009 | Maki | |
| 2010/0232593 A1 | 9/2010 | Ku | |

FOREIGN PATENT DOCUMENTS

| | | |
|---|---|---|
| CN | 101572680 A | 11/2009 |
| CN | 201467470 U | 5/2010 |
| FR | 2 899 406 A1 | 3/2006 |
| FR | 2899406 A1 | 10/2007 |
| FR | 2 941 585 A1 | 1/2009 |

OTHER PUBLICATIONS

European Patent Office. European Office Action dated Feb. 10, 2014. European Patent Application No. 118319466. Name of Applicant: ZTE Corporation. English Language. 9 pages.

* cited by examiner

MOBILE TERMINAL WITH ROUTING FUNCTION FOR SUPPORTING MULTIPLE-MODE ACCESS AND IMPLEMENTATION METHOD THEREOF

FIELD OF THE INVENTION

The present disclosure relates to the mobile terminal field, and more especially to a mobile terminal with routing function for supporting multiple-mode access and implementation method thereof.

BACKGROUND OF THE INVENTION

With the advent of the Third Generation (3G) era, for operators, the traditional voice service is being replaced by high speed multimedia service, so operators provide users with portable high-speed mobile terminals accessing the network together with a variety of multimedia services, which is an inevitable trend and a new profit growth point. In recent years, various mobile broadband terminal products grow vigorously and change with each passing day, and the technology is also continually updated. Especially for data cards, not only the demands are enormous, but also the requirements for the appearance and function are becoming increasingly higher. A variety of data cards are derived according to the demands of operators and customers from the simple Universal Serial Bus (USB) data card to the multimode & multisystem data card, built-in module and encryption data card.

Now, the design solutions of the mainstream data card are realized by simply combining a USB interface with a 3 G communication module. The existing data cards have the disadvantages below:

1. it can not enable multiple terminals to access the Internet simultaneously: a common data card only enables one user to access the Internet via the 3G network. While using the Wideband Code Division Multiple Access (WCDMA) network, the downlink rate can be up to 7.2 Mbit/s while the uplink rate can be up to 5.76 Mbit/s, which can absolutely support multiple users to access simultaneously. It makes full use of broadband resources for operators and saves a large amount of using expenses for users.
2. it relies on external equipment for power supply: the emphasis of the 3G era is mobility and sharing. But for the traditional USB data card, it has to rely on an equipment with a USB interface for power supply, such as a notebook, to realize the mobility. Inevitably, the allocation of the limited battery resources to data cards will shorten the outdoor usage time of the notebook, thus reducing the mobility remarkably.
3. it is not capable of making effective use of wired broadband: some locations using 3G signals to access the network sometimes also have wired broadband, for example at home or in work place. However, 3G signals sometimes are affected by many factors, such as weather, interference sources around, or use in the place where signal propagation is poor. In the circumstances that 3G signal propagation is poor and there is wired broadband available, the existing data card is not capable of making use of wired broadband.

A Chinese utility model whose application number is 200920057829.X discloses a wireless router which includes: a wireless broadband Wireless Fidelity (Wi-Fi) router, a 3G wireless communication module, a single-chip microcomputer AT89C52 and power supply unit. The utility model accesses the Internet via 3G signals and supports multiple terminals to access the Internet simultaneously via Wi-Fi routers, overcoming the disadvantages that 3G network cards only support one single user to access the Internet and Wi-Fi routers are not capable of accessing the mobile network. However, firstly the utility model does not access wired Asymmetrical Digital Subscriber Line (ADSL) signals, so it cannot make full use of wired broadband if the communication quality of 3G signals is affected by environmental factors. Secondly, the utility model is incapable of functioning without external power supply, so the portability and mobility is significantly degraded. Lastly, the 3G module is not integrated with the CPU in the utility model, which causes too many interface circuits, and the interface circuit does not adopt a high speed Secure Digital Input Output (SDIO) interface, so the speed and stability require improvement.

SUMMARY OF THE INVENTION

In view of above, the present disclosure mainly aims at providing a mobile terminal with routing function for supporting multiple-mode access and implementation method thereof, so as to solve the problem that data cards cannot access wired broadband signals and have to consume external power supply.

To achieve the objective above, the technical solution of the present disclosure is realized in this way:

the present disclosure provides a mobile terminal with routing function for supporting multiple-mode access, comprising: an ADSL interface module, a 3G interface module, a WIFI module and a main control module; wherein the ADSL interface module is configured to access ADSL wired broadband network, the 3G interface module is configured to access wireless broadband network, the WIFI module is configured to establish wireless local area network, and the main control module is configured to establish a first data transmission channel for connecting with the ADSL interface module, establish a second data transmission channel for connecting with the 3G interface module and control the WIFI module to access the first data transmission channel or the second data transmission channel.

In the mobile terminal above, the main control module further comprises: a signal detection circuit and a channel control circuit; wherein the signal detection circuit is configured to detect the wireless broadband signals accessed by the 3G interface module or the ADSL signals accessed by the ADSL interface module, the channel control circuit is configured to access the WIFI module to the first data transmission channel or the second data transmission channel according to the detection result of the signal detection circuit.

In the mobile terminal above, when the signal detection circuit detects the ADSL signals, the channel control circuit prefers to access the WIFI module to the first data transmission channel.

In the mobile terminal above, the channel control circuit controls the WIFI module to access the first data transmission channel by disconnecting the power supply of the 3G interface module; and controls the WIFI module to access the second data transmission channel by disconnecting the power supply of the ADSL interface module.

In the mobile terminal above, the main control module further comprises: a USB interface for connecting an external network terminals, configured to access the second data transmission channel under the control of the main control module.

In the mobile terminal above, the mobile terminal further comprises: a power supply module, configured to supply power for the main control module, the ADSL interface module, the 3G interface module and the WIFI module.

The present disclosure also provides a method for realizing the mobile terminal with routing function for supporting multiple-mode access, comprising: accessing ADSL wired broadband signals by an ADSL interface module; accessing wireless broadband signals by a 3G interface module; establishing wireless local area network by a WIFI module; and a main control module establishing a first data transmission channel for connecting with the ADSL interface module, establishing a second data transmission channel for connecting with the 3G interface module and controlling the WIFI module to access the first data transmission channel or the second data transmission channel.

In the method above, the step of the main control module establishing a first data transmission channel and a second data transmission channel, and controlling the WIFI module to access the first data transmission channel or the second data transmission channel comprises: the main control module detecting the wireless network signals input by the 3G interface module or the ADSL signals input by the ADSL interface module; and the main control module controlling the WIFI module to access the first data transmission channel or the second data transmission channel according to the detection result of the main control module.

In the method above, the step of the main control module controlling the WIFI module to access the first data transmission channel or the second data transmission channel according to the detection result of the main control module comprises: when the main control module detects the ADSL signals accessed by the ADSL interface module, controlling the WIFI module to access the first data transmission channel; when the main control module detects the USB signals accessed by the USB interface instead of the ADSL signals, controlling the USB interface to access the second data transmission channel; and when neither the ADSL signals nor USB signals are detected by the main control module, controlling the WIFI module to access the second data transmission channel.

The mobile terminal with routing function for supporting multiple-mode access and the implementation method thereof provided by the present disclosure, accessing ADSL wired broadband signals by an ADSL interface module, accessing wireless broadband signals by a 3G interface module, establishing wireless local area network by a WIFI module, a main control module establishing a first data transmission channel for connecting with the ADSL interface module, establishing a second data transmission channel for connecting with the 3G interface module, and controlling the WIFI module to access the first data transmission channel or the second data transmission channel, can access and convert wired broadband signals to WIFI signals, and therefore support multiple users to access the network simultaneously, realizing the wise integration of the wired and wireless accessing functions and increasing the use occasions of data cards. Since both computer USB interfaces and batteries can be used for supplying power for the present disclosure, its portability and mobility are improved.

DETAILED DESCRIPTION OF THE EMBODIMENTS

The basic concept of the present disclosure is as follows: accessing ADSL wired broadband signals by an ADSL interface module, accessing wireless broadband signals by a 3G interface module, establishing wireless local area network by a WIFI module, a main control module establishing a first data transmission channel for connecting with the ADSL interface module, establishing a second data transmission channel for connecting with the 3G interface module, and controlling the WIFI module to access the first data transmission channel or the second data transmission channel.

The present disclosure will be further illustrated hereinafter in conjunction with the drawings and the embodiments.

Figure 1:
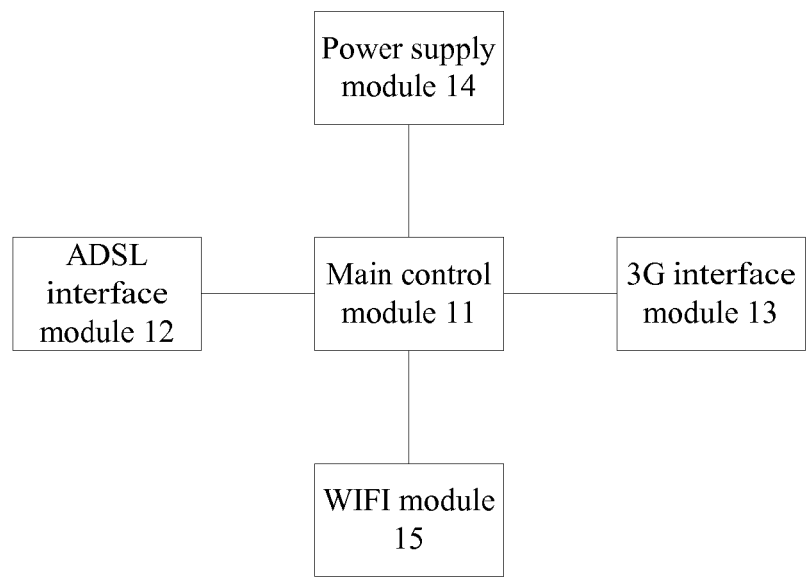
FIG. 1 is a schematic diagram of the structure of the mobile terminal with routing function for supporting multiple-mode access according to the present disclosure.

The present disclosure provides a mobile terminal with routing function for supporting multiple-mode access. FIG. 1 is a schematic diagram of the structure of the mobile terminal with routing function for supporting multiple-mode access according to the present disclosure. As shown in FIG. 1, the mobile terminal comprises: a main control module 11, an ADSL interface module 12, a 3G interface module 13, a power supply module 14 and a WIFI module 15.

The ADSL interface module 12 is configured to access ADSL wired broadband network.

The 3G interface module 13 is configured to access wireless broadband network;

the 3G interface module 13 accesses the mobile communication network at first, and then accesses the Internet via the mobile communication network. The mobile communication network can be GSM, UMTS, etc. The communication technologies adopted can be 2G, 2.5G or 3G. The mobile communication network can transmit voices, data or images.

The WIFI module 15 is configured to establish wireless local area network;

the WIFI module 15 converts the wireless broadband signals or the ADSL signals processed by the main control module 11 to WIFI signals so that multiple terminals in the wireless local area network can access the wireless broadband network or the ADSL wired broadband network simultaneously.

The main control module 11 is configured to establish a first data transmission channel for connecting with the ADSL interface module 12, establish a second data transmission channel for connecting with the 3G interface module 13 and control the WIFI module 15 to access the first data transmission channel or the second data transmission channel;

furthermore, the main control module further comprises a signal detection circuit and a channel control circuit; wherein the signal detection circuit is configured to detect the wireless broadband signals accessed by the 3G interface module 13 or the ADSL signals accessed by the ADSL interface module 12; the channel control circuit is configured to access the WIFI module 15 to the first data transmission channel or the second data transmission channel according to the detection result of the signal detection circuit; when the signal detection circuit detects the ADSL signals, the channel control circuit prefers to access the WIFI module to the first data transmission channel; the channel control circuit controls the WIFI module 15 to access the first data transmission channel by disconnecting the power supply of the 3G interface module 13; and controls the WIFI module 15 to access the second data transmission channel by disconnecting the power supply of the ADSL interface module 12;

the main control module 11 further includes a USB interface 24 for connecting external network terminals, which accesses the second data transmission channel under the control of the main control module 11, thus accessing wireless broadband network.

The main control module 11 is connected with the 3G interface module 13 via a dedicated interface circuit, but the main control module is connected with the WIFI module 15 via a SDIO interface. ADSL signals are accessed by the ADSL interface module 12 via an ADSL interface with USB as the interface mode, and then through the conversion chip between the USB and SDIO, and further through the SDIO interface connected with the main control module 11.

The power supply module 14 is configured to supply power for the main control module 11, the ADSL interface module 12, the 3G interface module 13 and the WIFI module 15.

Figure 2:
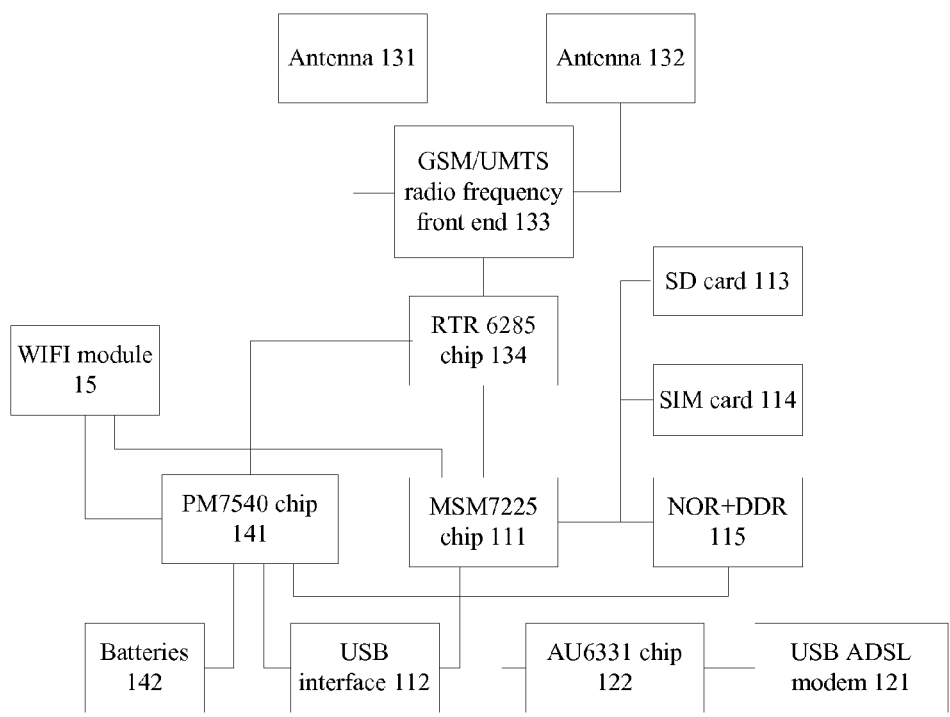
FIG. 2 is a schematic diagram of the circuit connection of the mobile terminal with routing function for supporting multiple-mode access according to the present disclosure.

FIG. 2 is a schematic diagram of the circuit connection of the mobile terminal with routing function for supporting multiple-mode access according to the present disclosure. As shown in FIG. 1 and FIG. 2:

the ADSL interface module 12 includes a USB ADSL modem 121 and a AU6331 chip 122, wherein the USB ADSL modem 121 is an equipment with USB as the interface mode, and providing modulation data and demodulation data, converting digital signals to the corresponding analog signals when sending data and converting analog signals to digital signals when receiving data; after the USB ADSL modem 121 accesses ADSL signals, converting analog signals to digital signals and inputting to the AU6331 chip 122, the AU6331 chip 122 transfers the ADSL digital signals input from the USB interface to the SDIO interface and inputs the ADSL digital signals to the main control module 11.

The 3G interface module 13 includes an antenna switch 131, an antenna switch 132, GSM/UMTS radio frequency (RF) front end 133 and a RTR6285 chip 134, wherein the antenna switches 131 and 132 are configured for receiving/sending switch and frequency band switch; the antenna switch 131 is configured to control an antenna of receiving of GSM network signals and the antenna switch 132 is configured to control an antenna of receiving of UMTS network signals; the GSM/UMTS RF front end 133 is mainly to complete the pre-selection, power amplification and automatic gain control, and convert the input wireless broadband network signals to intermediate frequency (IF) signals. The RTR6285 chip 134 is mainly configured to down-convert the IF signals input by the GSM/UMTS RF front end 133 to base-band signals.

The power supply module 14 includes a PM7540 chip 141 and a battery 142, wherein the PM7540 chip 141 is a power management chip; the use of a battery can enable the embodiment to work in outdoor conditions without any power supply available, the PM7540 chip 141 can realize the comprehensive management of working current, power consumption and temperature so as to ensure the stability and reliability of the embodiment.

The WIFI module 15, using the group module of ATHEROS, supporting IEEE802.11b/g and SDIO1.1 and with the maximum rate up to 25 Mbit/s, configured to establish wireless local area network to support multiple terminals to access the network simultaneously. The WIFI module 15 can access the first data transmission channel or the second data transmission channel under the control of the main control module 11. The first data transmission channel, as the one between the main control module 11 and the ADSL interface module 12, can access ADSL signals; the second data transmission channel, as the one between the main control module 11 and the 3G interface module 13, can access wireless broadband network signals. Besides, the WIFI module 15 can establish wireless local area network to support multiple external network terminals to access the WIFI module 15 via the wireless local area network, further to access the first data transmission channel or the second data transmission channel, and at last to access the Internet.

The main control module 11 includes a MSM7225 chip 111, a USB interface 112, a SD card 113, a SIM card 114 and a NOR+DDR 115; wherein the SD card 113, the SIM card 114 and the NOR+DDR 115 are connected with the MSM7225 chip 111; wherein the SD card 113, a secure digital card, is a new-generation memory device based on semiconductor flash memory; the SIM card 114 is a subscriber identity module card, configured to identify the identity of network subscribers; the NOR+DDR 115 is a memory used for storing data; the MSM7225 chip 111 is a main control chip, configured to control the ADSL interface module 12, the 3G interface module 13, the power supply module 14 and the WIFI module 15, establish a first data transmission channel for connecting with the ADSL interface module 12, a second data transmission channel for connecting with the 3G interface module, and control the WIFI module 15 to access the first data transmission channel or the second data transmission channel. The USB interface 112 is configured to connect with external network terminals and access the second data transmission channel under the control of the main control module 11.

The mobile terminal according to the present disclosure can be operated according to three modes, namely modem mode, 3G signal routing mode and ADSL signal routing mode.

The modem mode is connecting a computer by USB cables, enabling a computer to be directly networked using the wireless broadband network signals accessed by the 3G interface module 13; in the 3G signal routing mode, mobile terminals are not connected with a computer, and the wireless broadband network signals accessed by the 3G interface module 13 are converted to WIFI signals so as to support multiple external terminals to access the network simultaneously; in the ADSL routing mode, without being connected with a computer as well, the ADSL signals accessed by the ADSL interface module 12 are converted to WIFI signals so as to support multiple external terminals to access the network simultaneously.

While working, the operating mode is determined at first. The signal detection circuit of the main control module 11 detects whether there are ADSL signals accessed, if there are ADSL signals accessed, the channel control circuit switches the operating mode to the ADSL routing mode, otherwise the signal detection circuit further detects whether the USB interface 112 accesses USB signals, if there are USB signals accessed, the channel control circuit switches the operating mode to the modem mode, otherwise switches to the 3G routing mode; the USB power line of the ADSL interface of the USB ADSL modem 121 is connected to a Multipurpose in (MMP) of the PM7540 chip 141, and then the AMUX_OUT of the PM7540 chip 141 is connected to the HKADC of the MSM7225 chip 111, the HKADC is a 12 bit ADC, thus the MSM7225 chip 111 can monitor whether the ADSL interface accesses ADSL signals in real time; If ADSL signals are accessed while the 3G signal routing mode is used, the present disclosure can detect the access of the ADSL immediately and that ADSL access is being used will be prompted on the screen; LDO and PM7540 chip 141 supply power for the AU6331 chip 122, the general-purpose input/output (GPIO) of the MSM7225 chip 111 controls the work of the LDO while the PM7540 chip 141 is controlled by software. In this way, when the input of ADSL signals is detected, the AU6331 chip 122 is powered on to start to work and the operating mode is ADSL signal routing mode, otherwise the AU6331 chip 122 is disconnected and stops working; When the AU6331 chip 122 is disconnected, namely no ADSL signal is accessed, the MSM7225 chip 111 further judges whether the USB interface 112 is connected with any external terminal equipment, if yes, the modem mode is selected, otherwise the 3G signal routing mode is selected; The ADSL signal routing mode has the highest priority. If the ADSL is accessed, the ADSL routing mode is preferred according to the present disclosure and the use of the other two modes will be prohibited, which accords with the user habit that plugging of the ADSL is to use the ADSL signal routing mode and unplugging of the ADSL is to stop the use of the ADSL signal routing mode. To determine the operating mode, besides automatic performance by the signal detection circuit and the channel control circuit, manual setting is also feasible, for example, disconnect the power supply of the 3G interface module by pressing the button of the ADSL routing mode to realize the selection of the operating mode.

In the modem operating mode, the USB interface connects external network terminals to enable them to access the network via wireless broadband signals. Put the USIM card and batteries in place, connect the embodiment to a computer with a USB cable, press the "ON" button, then a voltage of USB5V enters the PM7540 chip 141 and the PM7540 chip 141 outputs voltages required by various circuits, afterwards, the embodiment starts to work, 3G signals are converted to IF signals via the GSM/UMTS RF front end 133, and then input to the RTR6285 chip 134 to down-convert to base-band signals. The base-band signals output by the RTR6285 chip 134 are input to the MSM7225 chip 111, and a DSP of the MSM7225 chip 111 completes modem algorithm protocol and demodulates the input base-band signals. The signals demodulated are input to the computer terminal via the USB interface 112, thus the computer terminal can access the network via the 3G signals.

In the 3G signal routing mode, 3G interface module 13 and WIFI module 15 can enable multiple terminals to access the network simultaneously; put the USIM card and batteries in place, press the "ON" button, then the voltage supplied by the batteries is input to the PM7540 chip 141 which outputs voltages required by various circuits, afterwards, the embodiment starts to work; 3G signals are converted to IF signals via the GSM/UMTS RF front end 133, and then input to the RTR6285 chip 134 to down-convert these signals to base-band signals. The base-band signals output by the RTR6285 chip 134 are input to the MSM7225 chip 111, and a DSP of the MSM7225 chip 111 completes modem algorithm protocol and demodulates the input base-band signals. Before demodulation, the 3G routing mode shares hardware circuits with the modem mode, after demodulation, another DSP of the MSM7225 chip 111 completes routing algorithm protocol and realizes routing function via the SDIO interface connected with the WIFI module 15.

In the ADSL signal routing mode, ADSL interface module 12 and WIFI module 15 enable multiple terminals to access the network simultaneously; put the USIM card and batteries in place, press the "ON" button, then the voltage supplied by the batteries are input to the PM7540 chip 141 which outputs voltages required by various circuits, the AU6331 chip 122 requires 3.3V and 2.5V voltages, wherein the 3.3V is supplied by the additional LDO, and the 2.2V is supplied by the PM7540 chip 141; USB ADSL modem 121, the modem of the USB interface, converts the ADSL signals accessed from analog signals to digital signals and inputs them to the AU6331 chip 122, and the AU6331 chip 122 switches the USB interface to the SDIO interface and connects it to one of the four SDIO interfaces of the MSM7225 chip 111, thus the routing algorithm and protocol of the ADSL signals can be realized in the DSP via the internal bus of the MSM7225 chip 111, and the routing and the network accessing of multiple terminals can be realized via the WIFI module 15.

Figure 3:
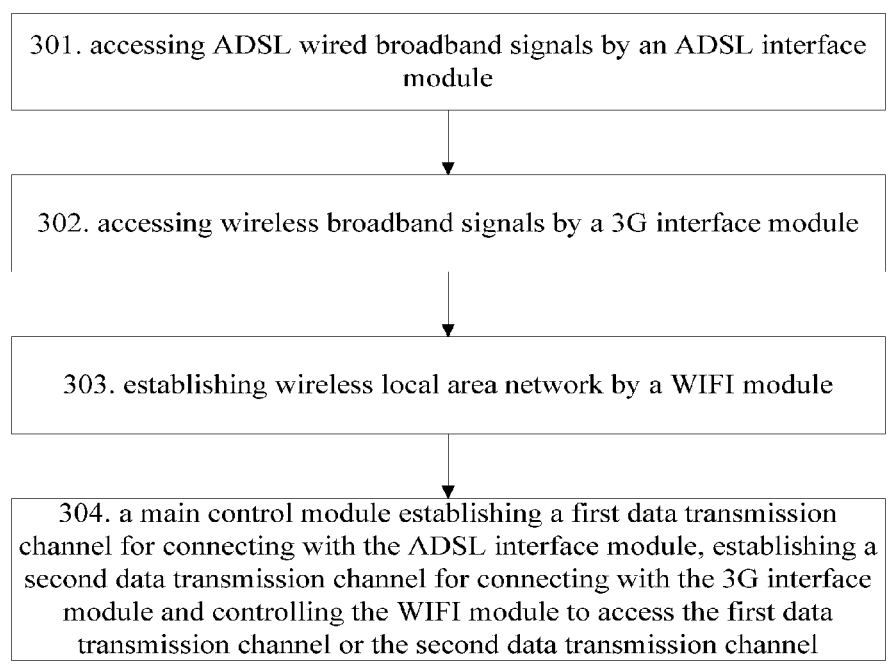
FIG. 3 is a schematic diagram of the flow of the method for realizing the mobile terminal with routing function for supporting multiple-mode access according to the present disclosure.

Based on the mobile terminal above, the present disclosure also provides a method for realizing the mobile terminal with routing function for supporting multiple-mode access. FIG. 3 is a schematic diagram of the flow of the method for realizing the mobile terminal with routing function for supporting multiple-mode access according to the present disclosure. As shown in FIG. 3, the method includes the steps below:

Step 301, accessing ADSL wired broadband signals by an ADSL interface module;

Step 302, accessing wireless broadband signals by a 3G interface module;

Step 303, establishing wireless local area network by a WIFI module;

Step 304, a main control module establishing a first data transmission channel for connecting with the ADSL interface module, establishing a second data transmission channel for connecting with the 3G interface module and controlling the WIFI module to access the first data transmission channel or the second data transmission channel.

Wherein Step 304 specifically includes:
 (1) the main control module detects the wireless network signals input by the 3G interface module or the ADSL signals input by the ADSL interface module;
 (2) the main control module controls the WIFI module to access the first data transmission channel or the second data transmission channel according to the detection result of Step (1);

Wherein Step (2) specifically includes:

once the main control module detects the ADSL signals accessed by the ADSL interface module, controlling the WIFI module to access the first data transmission channel;

when the main control module detects the USB signals accessed by the USB interface instead of the ADSL signals, controlling the USB interface to access the second data transmission channel;

when neither the ADSL nor USB signals are detected by the main control module, controlling the WIFI module to access the second data transmission channel.

With the ADSL interface module 12, the WIFI module 15, the 3G interface module 13 and the main control module 11, the present disclosure accesses and converts ADSL signals or wireless broadband signals to WIFI signals to realize that multiple terminals access the Internet simultaneously, thus achieving the wise integration of the wired and wireless accessing functions. Besides, batteries are used for supplying power which increases the use occasions of the present disclosure and improves the mobility and portability of the present disclosure.

To sum up, the present disclosure has the technical effects below:
 1. both 3G signals and ADSL signals can be converted to WIFI signals, realizing the integration of the wired and wireless.
 2. both computer USB interfaces and batteries can be used for supplying power for the present disclosure, so its portability and mobility are improved.

Despite detailed illustration above, the present disclosure is not limited to this and the technicians in the field can make various modifications according to the principles of the present disclosure. Therefore, any modifications made based on the principles of the present disclosure shall be understood to be in the protection scope of the present disclosure.

What is claimed is:

1. A mobile terminal with routing function for supporting multiple-mode access, comprising:
   an Asymmetrical Digital Subscriber Line (ADSL) interface module, a Third Generation (3G) interface module, a Wireless Fidelity (WIFI) module and a main control module; wherein
   the ADSL interface module is configured to access ADSL wired broadband network;
   the 3G interface module is configured to access wireless broadband network;
   the WIFI module is configured to establish wireless local area network; and
   the main control module is configured to establish a first data transmission channel for connecting with the ADSL interface module, establish a second data transmission channel for connecting with the 3G interface module and control the WIFI module to access the first data transmission channel or the second data transmission channel;
   wherein the main control module further comprises:
      a signal detection circuit, wherein the signal detection circuit is configured to detect wireless broadband signals accessed by the 3G interface module or ADSL signals accessed by the ADSL interface module; and
      a channel control circuit, wherein the channel control circuit is configured to access the WIFI module to the first data transmission channel or the second data transmission channel according to the detection result of the signal detection circuit, wherein the channel control circuit controls the WIFI module to access the first data transmission channel by disconnecting the power supply of the 3G interface module and controls the WIFI module to access the second data transmission channel by disconnecting the power supply of the ADSL interface module; and
      wherein when the signal detection circuit detects the ADSL signals, the channel control circuit controls the WIFI module to priority access the first data transmission channel.

2. The mobile terminal as claimed in claim 1, wherein the main control module further comprises:
   a Universal Serial Bus (USB) interface for connecting an external network terminal, configured to access the second data transmission channel under the control of the main control module.

3. The mobile terminal as claimed in claim 1, wherein the mobile terminal further comprises:
   a power supply module, configured to supply power for the main control module, the ADSL interface module, the 3G interface module and the WIFI module.

4. The mobile terminal as claimed in claim 2, wherein the mobile terminal further comprises:
   a power supply module, configured to supply power for the main control module, the ADSL interface module, the 3G interface module and the WIFI module.

5. A method for realizing a mobile terminal with routing function for supporting multiple-mode access, comprising:
   accessing Asymmetrical Digital Subscriber Line (ADSL) wired broadband signals by a ADSL interface module;
   accessing wireless broadband signals by a Third Generation (3G) interface module;
   establishing wireless local area network by a Wireless Fidelity (WIFI) module; and
   a main control module establishing a first data transmission channel for connecting with the ADSL interface module, establishing a second data transmission channel for connecting with the 3G interface module and controlling the WIFI module to access the first data transmission channel or the second data transmission channel;
   wherein the step of the main control module establishing a first data transmission channel and a second data transmission channel, and controlling the WIFI module to access the first data transmission channel or the second data transmission channel comprises:
      the main control module detecting wireless network signals input by the 3G interface module or ADSL signals input by the ADSL interface module; and
      the main control module controlling the WIFI module to access the first data transmission channel or the second data transmission channel according to the detection of the main control module, wherein the step of the main control module controlling the WIFI module further comprises:
         when the main control module detects the ADSL signals accessed by the ADSL interface module, controlling the WIFI module to access the first data transmission channel;
         when the main control module detects the Universal Serial Bus (USB) signals accessed by a USB interface instead of the ADSL signals, controlling the USB interface to access the second data transmission channel; and
         when neither the ADSL signals nor the USB signals are detected by the main control module, controlling the WIFI module to access the second data transmission channel.

* * * * *